US012735176B2

(12) United States Patent
Hamers et al.

(10) Patent No.: US 12,735,176 B2
(45) Date of Patent: Sep. 15, 2026

(54) ROTORCRAFT WITH AN AUTOROTATION TRAINING MODE CONTROL SYSTEM

(71) Applicant: AIRBUS HELICOPTERS DEUTSCHLAND GMBH, Donauwörth (DE)

(72) Inventors: Mario Hamers, Donauwörth (DE); Rene Nater, Asbach-Bäumenheim (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 18/966,672

(22) Filed: Dec. 3, 2024

(65) Prior Publication Data

US 2025/0319964 A1 Oct. 16, 2025

(30) Foreign Application Priority Data

Apr. 11, 2024 (EP) .................................... 24169694

(51) Int. Cl.
*B64C 27/00* (2006.01)
*G09B 9/46* (2006.01)

(52) U.S. Cl.
CPC ................ *B64C 27/00* (2013.01); *G09B 9/46* (2013.01)

(58) Field of Classification Search
CPC ....... B64C 27/00; B64C 13/18; B64C 27/006; B64C 27/04; B64C 13/042; G09B 9/08; G09B 9/46
See application file for complete search history.

(56) References Cited

U.S. PATENT DOCUMENTS

| | | | | |
|---|---|---|---|---|
| 11,194,349 | B2 | 12/2021 | White et al. | |
| 11,208,205 | B2 | 12/2021 | Gillett | |
| 11,383,829 | B2 | 7/2022 | Worsham, II et al. | |
| 2014/0027565 | A1 | 1/2014 | Marvin et al. | |
| 2017/0144752 | A1 | 5/2017 | Vallart | |
| 2018/0251214 | A1* | 9/2018 | Lavallee ................ | B64D 31/04 |
| 2020/0277072 | A1 | 9/2020 | Zoppitelli et al. | |
| 2024/0404424 | A1* | 12/2024 | Dumur ...................... | F02C 9/42 |

(Continued)

FOREIGN PATENT DOCUMENTS

| | | | |
|---|---|---|---|
| CN | 115762292 A * | 3/2023 | |
| EP | 3800119 B1 | 9/2022 | |

OTHER PUBLICATIONS

Machine translation of CN115762292A.*

(Continued)

*Primary Examiner* — Robert T Nguyen
(74) *Attorney, Agent, or Firm* — BROOKS KUSHMAN P.C.

(57) ABSTRACT

A rotorcraft with at least one main rotor and at least one engine for powering the at least one main rotor in a normal flight mode, comprising an autorotation training mode control system that is activatable for switching rotorcraft operation between the normal flight mode and an autorotation training mode configured to enable training of autorotation, wherein the autorotation training mode control system comprises at least one main control element that is manually operable for activating the autorotation training mode control system and switching the rotorcraft operation from the normal flight mode to the autorotation training mode to engage the autorotation training mode.

18 Claims, 3 Drawing Sheets

(56) References Cited

U.S. PATENT DOCUMENTS

| | | | | |
|---|---|---|---|---|
| 2025/0019089 | A1* | 1/2025 | Groden | G05D 1/854 |
| 2025/0182646 | A1* | 6/2025 | Dumur | B64C 27/06 |

OTHER PUBLICATIONS

European Search Report for European Application No. EP 24169694.7, Completed by the European Patent Office, Dated Sep. 3, 2024, 9 pages.

* cited by examiner

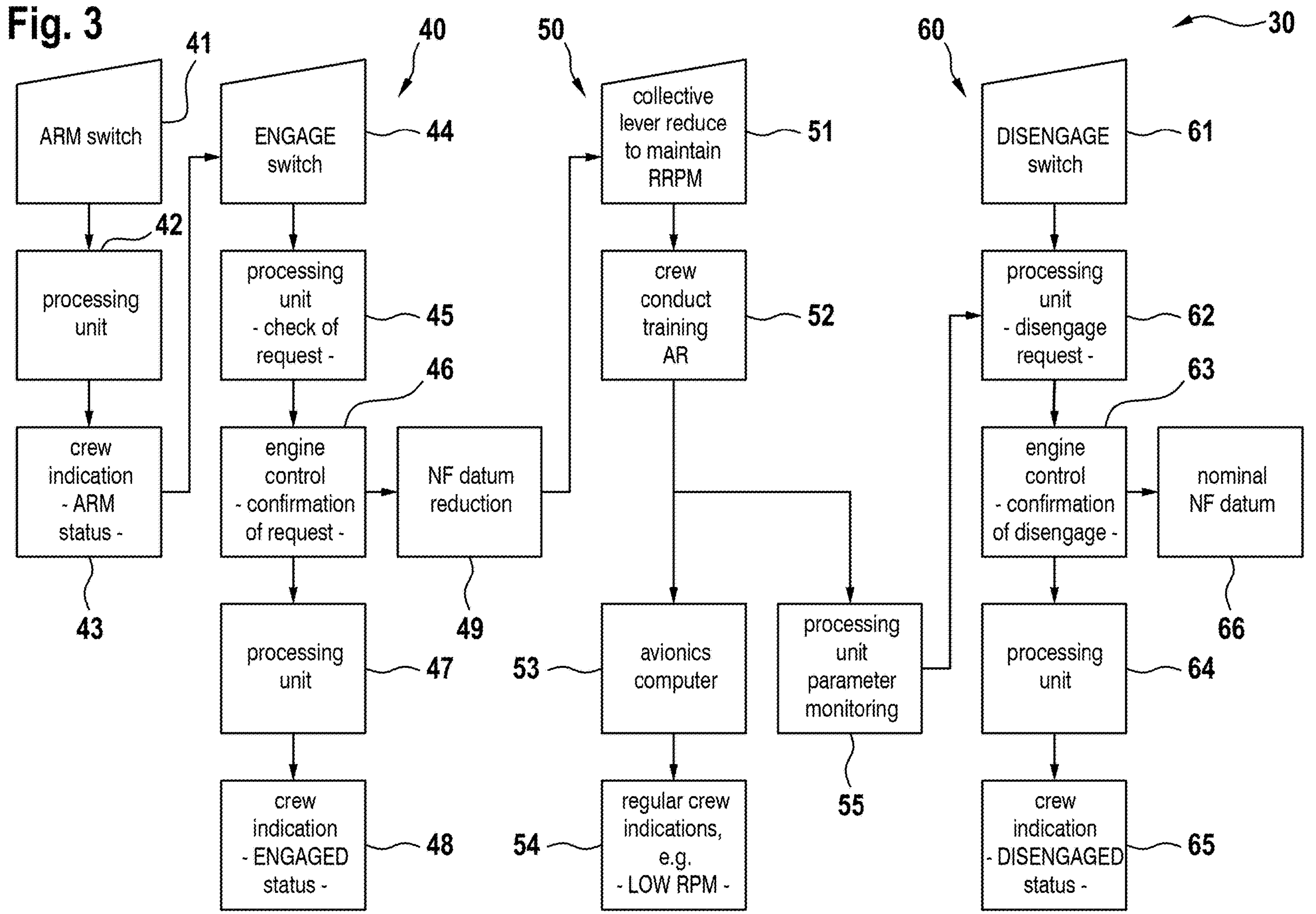
Fig. 3
30
ARM switch
41
processing unit
42
crew indication - ARM status -
43
40
ENGAGE switch
44
processing unit - check of request -
45
engine control - confirmation of request -
46
NF datum reduction
49
processing unit
47
crew indication - ENGAGED status -
48
50
collective lever reduce to maintain RRPM
51
crew conduct training AR
52
avionics computer
53
regular crew indications, e.g. - LOW RPM -
54
processing unit parameter monitoring
55
60
DISENGAGE switch
61
processing unit - disengage request -
62
engine control - confirmation of disengage -
63
nominal NF datum
66
processing unit
64
crew indication - DISENGAGED status -
65

ROTORCRAFT WITH AN AUTOROTATION TRAINING MODE CONTROL SYSTEM

CROSS-REFERENCE TO RELATED APPLICATIONS

This application claims priority to European patent application No. EP 24169694.7 filed on Apr. 11, 2024, the disclosure of which is incorporated in its entirety by reference herein.

TECHNICAL FIELD

The disclosure is related to a rotorcraft with at least one main rotor and at least one engine for powering the at least one main rotor in a normal flight mode, wherein the rotorcraft is adapted to enable training of autorotation.

BACKGROUND

More generally, in a rotorcraft that comprises at least one main rotor and at least one engine for powering the at least one main rotor in a normal flight mode, flying in autorotation may be required in cases where the power generated by the at least one engine is no more sufficient for driving the at least one main rotor, e.g., because of a failure. In such cases, the kinetic energy in the rotor system and the airflow through the at least one main rotor of the rotorcraft descending towards ground serves to drive the at least one main rotor in rotation, which is commonly referred to as "autorotation" and which gives rise to a lift force that is generally sufficient for landing the rotorcraft safely on ground.

By way of example, the documents EP 3 800 119 B1, U.S. Pat. Nos. 11,383,829 B2, 11,194,349 B2, and 11,208,205 B2 describe systems and methods related to automation of autorotation of rotorcrafts as well as to support of rotorcraft pilots during autorotation. Nevertheless, despite the provision of such automated systems and methods, pilots of rotorcrafts should be trained specifically for being capable of piloting a rotorcraft in autorotation, whereby a suitable autorotation training is usually conducted on multi-engine helicopters in a procedural way.

More particularly, a major part of such autorotation training in a procedural way consists generally in performing steady autorotation during flight, i.e., a simulated autorotation with recovery up in the air, hence, without landing on ground. Steady autorotation is usually started at about 2000 ft above ground level (AGL) or above by setting the rotorcraft's engines to IDLE condition, performing a descent in autorotation, and re-engaging the rotorcraft's engines at about 1000 ft AGL. Nevertheless, some critical issues must be taken into consideration when performing such a steady autorotation: Firstly, the rotorcraft's engines usually accelerate very slowly back from IDLE condition to FLIGHT condition, leading generally to a height loss of almost 700 ft before recovering full power and, secondly, a respective flight instructor performing steady autorotation with a flight student must take his hands off the rotorcraft's controls to set the rotorcraft's engines back to FLIGHT condition, which might become very contra-productive in this phase of training.

A more secure manner of performing steady autorotation during flight may include gradually lowering the rotorcraft's collective controls until desynchronization of the at least one main rotor instead of setting the rotorcraft's engines to IDLE condition. In this case, however, the narrow band of main rotor rotational speed from 100% (reference) to 107.5% in combination with the "lively" rotor speed may lead to inadvertent (re-)synchronization or exceedances into high transient range.

In any case, considering that steady autorotation is already a very challenging task, it must be noted that full autorotation, i.e., autorotation to the ground including landing of a given rotorcraft on ground, is an even more challenging task which is likewise applicable to training of full autorotation. More specifically, the following issues are considered as being particularly critical in training of full autorotation: Firstly, a complete lack of escape possibility for a flight instructor at an autorotation flight height below 700 ft if a respectively trained flight student exceeds required safety margins and, secondly, an eventually comparatively strong drop in main rotor rotational speed during a possibly occurring slide phase after landing on ground, which might result in undesired lead/lag resonances in the at least one main rotor of the rotorcraft.

SUMMARY

It is, therefore, an object of the present disclosure to provide a new rotorcraft which enables an improved autorotation training with enhanced safety and reduced criticality. This object is solved by a rotorcraft.

More specifically, according to the present disclosure a rotorcraft with at least one main rotor and at least one engine for powering the at least one main rotor in a normal flight mode comprises an autorotation training mode control system that is activatable for switching rotorcraft operation between the normal flight mode and an autorotation training mode configured to enable training of autorotation. The autorotation training mode control system comprises at least one main control element that is manually operable for activating the autorotation training mode control system and switching the rotorcraft operation from the normal flight mode to the autorotation training mode to engage the autorotation training mode.

Advantageously, the rotorcraft according to the present disclosure is configured to enable engagement of a dedicated autorotation training mode in order to facilitate autorotation training, to enhance safety, to reduce a number of potential structural damages to the rotorcraft which may result from autorotation training, and to render the autorotation training as realistic as possible. The dedicated autorotation training mode may be used for training of full autorotation including landing on ground, for enhancement of training of steady autorotation, i.e., without landing on ground, or even for training of hover autorotation.

If this dedicated autorotation training mode is engaged in normal FLIGHT condition of a given rotorcraft by a flight instructor, a predefined ratio between the engine free turbine speed and the main rotor rotational speed is preferably decreased with a prescribed, comparatively fast rate to a clearly lower value by decreasing a predetermined engine free turbine speed datum by a predetermined reduction rate, i.e., from a nominal engine free turbine speed to a predefined decreased engine free turbine speed. Thus, a respective flight student must immediately lower the collective lever and desynchronize the at least one main rotor while keeping the main rotor rotational speed high within required bounds and, hence, starting a respective autorotation training. In this phase all aspects of a full autorotation within a wide range of main rotor rotational speed may be trained.

If training of full autorotation including landing on ground is envisaged in the dedicated autorotation training mode, the main rotor rotational speed of the at least one main rotor will preferably droop only as far as the predetermined engine free turbine speed datum is decreased, e.g., to 90%, and therewith prevents the at least one main rotor to drop below the self-sustaining speed and below the critical lead-lag resonance speed, as otherwise an associated elastic blade suspension could be damaged.

In any case, the flight instructor preferably closely monitors all actions of the flight student and may deactivate at any time the dedicated autorotation training mode, preferentially by pushing a dedicated button or switch provided on his cyclic stick and/or on the collective lever, without releasing his hands from the respective control member. Upon deactivation of the dedicated autorotation training mode, the at least one engine preferably immediately spools back to the nominal engine free turbine speed such that a safe flight condition can be maintained, resulting in a significant safety enhancement. In addition, there is no need to manipulate engine switches for deactivating the dedicated autorotation training mode, i.e., for switching the at least one engine from IDLE condition to the normal FLIGHT condition, which again enhances safety by excluding, for instance, a real One Engine Inoperative case due to a switch failure.

In case of an inadvertent or erroneous activation of the dedicated autorotation training mode or a non-reaction of the flight student, the engine free turbine speed as well as the main rotor rotational speed of the at least one main rotor will spool down from the nominal engine free turbine speed towards the predefined decreased engine free turbine speed, but the flight instructor will maintain or even pull the collective lever. Thus, depending on respectively prevailing conditions the main rotor torque will at least not significantly drop and eventually even increase. In particular, if the flight instructor deliberately pulls the collective lever, the main rotor torque will increase.

In addition, or alternatively, one or more suitable auto-kick-out criteria are preferably defined for automatically disengaging the dedicated autorotation training mode and, subsequently, reverting to the normal FLIGHT condition. By way of example, suitable auto-kick-out criteria may include a time elapsed since activation of the dedicated autorotation training mode without any control action of the flight student, and/or decrease of the main rotor torque below a predetermined torque threshold, and so on.

In any case, the dedicated autorotation training mode enhances training efficiency since it allows a far wider range of main rotor rotational speed as it would have with engines in FLIGHT condition where a steady reengagement of the engines above a predefined engine free turbine speed reference distracts and complicates autorotative main rotor rotational speed control deteriorating the training effect. Advantageously, the dedicated autorotation training mode could ty up with a dedicated One Engine Inoperative training mode.

According to a preferred embodiment, the rotorcraft comprises at least one of a main instrument panel, a slant console, and a middle console, wherein the at least one main control element is arranged on one of the main instrument panel, the slant console, or the middle console.

The at least one main control element may be a switch or a button.

Preferably, the at least one main control element is further manually operable for deactivating the autorotation training mode control system and disengaging the autorotation training mode for switching the rotorcraft operation from the autorotation training mode to the normal flight mode.

According to a preferred embodiment, the rotorcraft comprises at least one auxiliary control element that is manually operable for activating the autorotation training mode control system and switching the rotorcraft operation from the normal flight mode to the autorotation training mode to engage the autorotation training mode, and/or for deactivating the autorotation training mode control system and disengaging the autorotation training mode for switching the rotorcraft operation from the autorotation training mode to the normal flight mode.

Preferably, the rotorcraft comprises at least one of a center collective lever or stick, a pilot cyclic stick, and a co-pilot cyclic stick, wherein the at least one auxiliary control element is arranged on one of the center collective lever or stick, the pilot cyclic stick, and/or the co-pilot cyclic stick.

The at least one auxiliary control element may be a switch or a button.

According to a preferred embodiment, the autorotation training mode control system comprises a data processing unit configured to control execution of the autorotation training mode.

Preferably, the data processing unit enables execution of the autorotation training mode only if predetermined execution conditions are fulfilled.

Preferably, the at least one engine is monitored by a Full Authority Digital Engine Control, and the predetermined execution conditions are preferably fulfilled if: no failure levels, preferably no failure levels 1 to 3, are detected on the Full Authority Digital Engine Control, no One Engine Inoperative training mode is engaged, and engine torque of the at least one engine is below a predetermined threshold.

Preferably, the data processing unit decreases a predetermined engine free turbine speed datum by a predetermined reduction rate during execution of the autorotation training mode.

According to a preferred embodiment, the autorotation training mode control system is configured for disengaging the autorotation training mode if one or more predetermined disengagement conditions are fulfilled.

The data processing unit may monitor rotorcraft operating parameters for determining whether the one or more predetermined disengagement conditions are fulfilled.

Preferably, the one or more predetermined disengagement conditions are fulfilled if: an actual engine free turbine speed value is below a predetermined engine free turbine speed autorotation reference value, a torque demand increases for a predefined duration above a predetermined torque threshold, and/or a predetermined duration after engagement of the autorotation training mode expires without rotor desynchronization.

According to a preferred embodiment, the autorotation training mode control system comprises a display indicator for visualizing engagement of the autorotation training mode.

BRIEF DESCRIPTION OF DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description;

FIG. 3 shows a flow diagram that illustrates execution of an autorotation training mode using the rotorcraft of FIG. 1 with the operator workspace and the autorotation training mode control system of FIG. 1 and FIG. 2 according to an illustrative realization.

DETAILED DESCRIPTION

Figure 1:
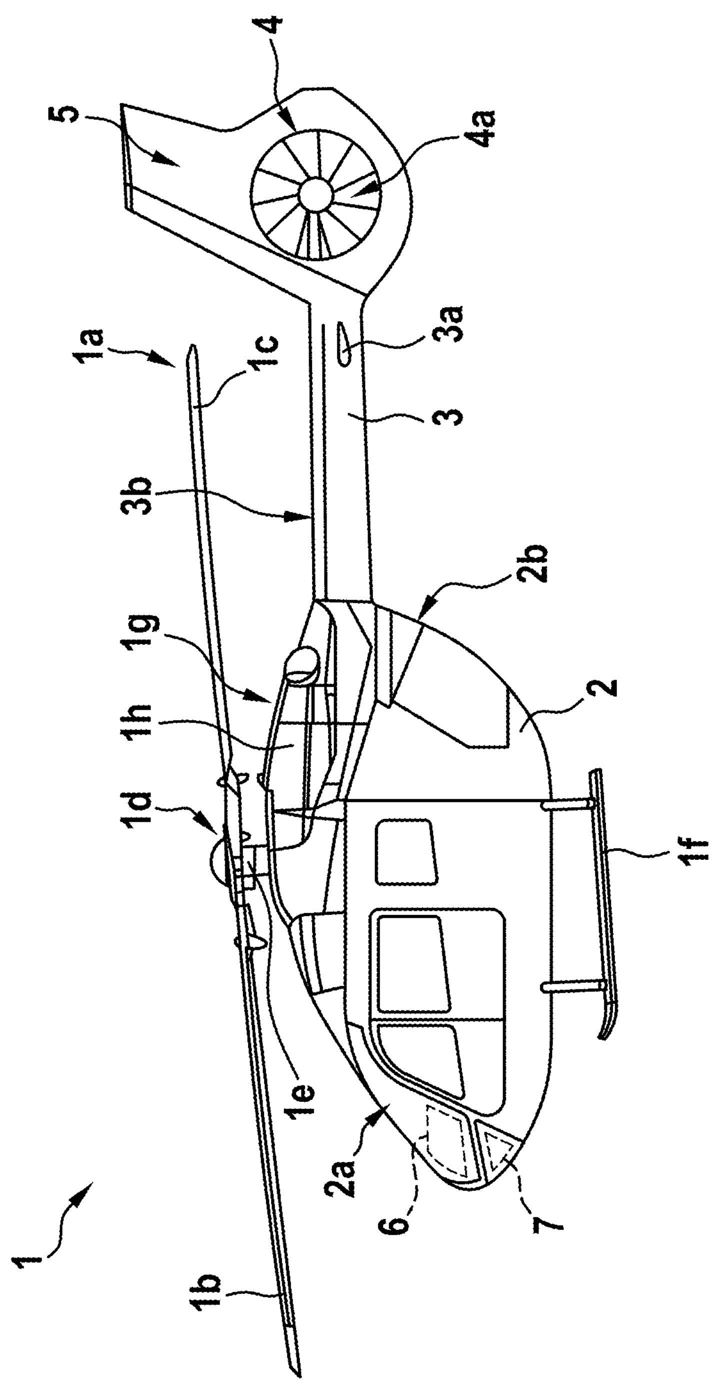
FIG. 1 shows a lateral view of an illustrative rotorcraft that comprises an operator workspace and an autorotation training mode control system according to the present disclosure.

FIG. 1 shows a rotorcraft 1 that is illustratively embodied as a helicopter and hereinafter referred to as the "helicopter 1", for purposes of simplicity and clarity. The present disclosure is, however, not limited to helicopters and may likewise be applied to any other rotorcraft.

The helicopter 1 comprises at least one main rotor 1*a* for providing lift and forward, sideward or backward thrust during operation. By way of example, the at least one main rotor 1*a* is embodied as a multi-blade main rotor that comprises a plurality of rotor blades which are connected at an associated rotor head 1*d* to a rotor shaft 1*e*, which rotates in operation of the helicopter 1 about an associated rotor axis. Two rotor blades of the plurality of rotor blades are illustratively separately labelled with the reference signs 1*b*, 1*c*.

Furthermore, the helicopter 1 comprises at least one engine 1*g* for powering the at least one main rotor 1*a* in a normal flight mode. Preferably, the at least one engine 1*g* is controlled and monitored in operation using e.g., a Full Authority Digital Engine Control (FADEC—20 in FIG. 2).

Illustratively, the helicopter 1 is embodied with a twin-engine configuration having two engines from which only one engine 1*h* is visible in FIG. 1, as it is arranged on the left-hand side, i.e., the portside of the helicopter 1. In this twin-engine configuration, another engine may e.g., be arranged in addition to the engine 1*h* on a right-hand side, i.e., the starboard side of the helicopter 1, which is not visible in FIG. 1. According to one aspect, the helicopter 1 may be configured to enable execution of an intentional One Engine Inoperative (OEI) flight mode, as well as execution of an associated OEI training mode.

Moreover, the helicopter 1 preferably comprises a fuselage 2 to which illustratively a landing gear 1*f* of the skid-type is attached. By way of example, a left-hand side of the fuselage 2 is shown and, thus, a portside wall of the fuselage 2 of the helicopter 1. Illustratively, the fuselage 2 forms an aircraft interior region that accommodates a cockpit 2*a* and that may further accommodate a cabin for passengers and/or cargo. Moreover, the fuselage 2 may be connected at a rear fuselage 2*b* to a tail boom 3 with a horizontal stabilizer 3*a*. The tail boom 3 may be implemented as a slim beam element that comprises at least a tubular tail boom cone 3*b*.

By way of example, the helicopter 1 further comprises at least one preferentially shrouded counter-torque device 4 configured to provide counter-torque during operation, i.e., to counter the torque created by rotation of the at least one main rotor 1*a* for purposes of balancing the helicopter 1 in terms of yaw. The at least one counter-torque device 4 is illustratively provided at an aft section of the tail boom 3 and preferably comprises a tail rotor 4*a*. However, provision of the tail rotor 4*a* and, more generally, of the shrouded counter-torque device 4 may e.g., be omitted if the at least one main rotor 1*a* is implemented in multi-rotor configuration, for instance, in tandem or co-axial multi-rotor configuration. The aft section of the tail boom 3 may further comprise a fin 5.

Illustratively, the helicopter 1 comprises an operator workspace 6 provided for a pilot and/or co-pilot piloting the helicopter 1. In general, the operator workspace 6 may include pedals or any other device that the pilot and/or co-pilot controls with the feet when piloting the helicopter 1; at least one display, one or more rear-view mirrors, or any other device that the pilot and/or co-pilot may observe when piloting the helicopter 1; speakers, headsets, or any other device that the pilot and/or co-pilot may listen when piloting the helicopter 1; handles, buttons, switches, a cyclic center stick or cyclic side sticks as well as a center collective stick or lever or collective side sticks or levers, or any other device that the pilot and/or co-pilot controls with the hands when piloting the helicopter 1; etc.

According to the present disclosure, the helicopter 1 further comprises an autorotation training mode control system 7 that is activatable for switching rotorcraft operation between the normal flight mode and an autorotation training mode configured to enable training of autorotation. The autorotation training mode control system 7 may at least partly be integrated into the operator workspace 6, as further described below at FIG. 2.

Figure 2:
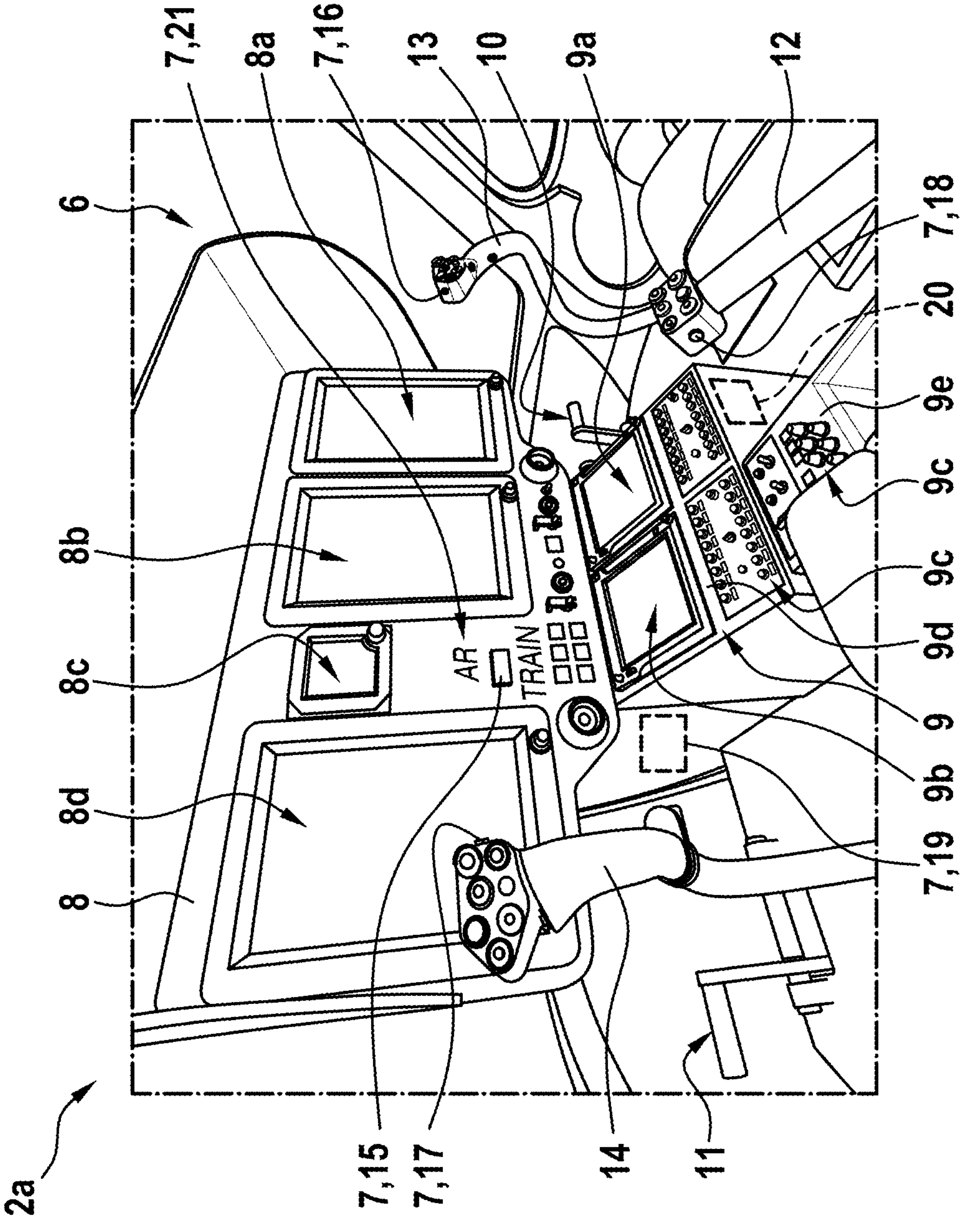
FIG. 2 shows a perspective view of an illustrative realization of the operator workspace and the autorotation training mode control system of FIG. 1.

FIG. 2 shows an illustrative realization of the operator workspace 6 and the autorotation training mode control system 7 of FIG. 1. Furthermore, a FADEC 20 is shown, which is provided for controlling and monitoring the at least one engine 1*g* of FIG. 1. However, implementation and functionality of a FADEC in general is well-known to the person skilled in the art so that a detailed description of the FADEC 20 may be omitted, for brevity and conciseness. However, it should be noted that the FADEC 20 is only shown by way of example and not for limiting the present disclosure accordingly. Instead, controlling and monitoring of the at least one engine 1*g* of FIG. 1 may be performed by any suitable controlling and monitoring means.

The operator workspace 6 comprises, by way of example, a main instrument panel 8 and a center console 9. The main instrument panel 8 may e.g., comprise a plurality of main instrument panel displays 8*a*, 8*b*, 8*c*, 8*d*. The center console 9 is illustratively divided into a slant console 9*d* and a middle console 9*e*. The slant console 9*d* may e.g., comprise a plurality of center console displays 9*a*, 9*b*. The middle console 9*e*, and likewise the slant console 9*d*, may e.g., comprise a plurality of switches and/or buttons 9*c*. Furthermore, the operator workspace 6 illustratively comprises pilot and co-pilot pedals 10, 11, a collective stick or lever 12, a pilot cyclic stick 13, and a co-pilot cyclic stick 14.

At this point, it should be noted that for simplicity and clarity of the drawing only a single center collective stick or lever, i.e., the collective stick or lever 12, is shown. However, as already mentioned above two separate collective sticks or levers may also be provided instead, i.e., a pilot collective stick or lever and a co-pilot collective stick or lever. Therefore, any reference hereinafter to the collective stick or lever 12 and its configuration should be understood as being representative for one or both of such a pilot collective stick or lever and/or a co-pilot collective stick or lever and their respective configurations.

It should further be noted that configuration and construction of suitable operator workspaces which may be used to implement the operator workspace 6 are well-known to the person skilled in the art and, as such, not part of the present disclosure. Therefore, a more detailed description of construction and functioning of the operator workspace 6 and/or individual components thereof is omitted, for brevity and conciseness.

Illustratively, the autorotation training mode control system 7 is at least partly integrated into the operator workspace 6. More particularly, at least a part of the components of the autorotation training mode control system 7 is preferably integrated into the operator workspace 6, e.g., mounted to or arranged on elements of or in the operator workspace 6, as described in detail hereinafter.

According to the present disclosure, the autorotation training mode control system 7 comprises at least one main control element 15 that is manually operable for activating the autorotation training mode control system 7 and switching rotorcraft operation, i.e., operation of the helicopter 1 of FIG. 1, from normal flight mode to autorotation training mode to engage the autorotation training mode. The at least one main control element 15 may further be manually operable for deactivating the autorotation training mode control system 7 and disengaging the autorotation training mode for switching the rotorcraft operation, i.e., the operation of the helicopter 1, from the autorotation training mode to the normal flight mode.

By way of example, the at least one main control element 15 is arranged on the main instrument panel 8. Alternatively, the at least one main control element 15 may e.g., be arranged on the slant console **9*d* or the middle console 9*e*, or on any other element in the operator workspace 6 that is at least easily accessible by the co-pilot and/or pilot. Preferably, the at least one main control element 15** is a switch or a button.

Illustratively, the at least one main control element 15 is associated with a display indicator 21 of the autorotation training mode control system 7. The display indicator 21 is preferably provided for visualizing engagement of the autorotation training mode.

Furthermore, the autorotation training mode control system 7 may comprise at least one auxiliary control element that is manually operable for activating the autorotation training mode control system 7 and switching the rotorcraft operation, i.e., the operation of the helicopter 1 of FIG. 1, from the normal flight mode to the autorotation training mode to engage the autorotation training mode, and/or for deactivating the autorotation training mode control system 7 and disengaging the autorotation training mode for switching the rotorcraft operation, i.e., the operation of the helicopter 1, from the autorotation training mode to the normal flight mode. The at least one auxiliary control element may be a switch or a button. Preferably, the at least one auxiliary control element is arranged on one of the collective stick or lever 12, the pilot cyclic stick 13, and/or the co-pilot cyclic stick 14.

By way of example, a first auxiliary control element 16 in the form of a switch or button is arranged on the pilot cyclic stick 13. Furthermore, a second auxiliary control element 17 in the form of a switch or button is arranged on the co-pilot cyclic stick 14. Moreover, a third auxiliary control element 18 in the form of a switch or button is arranged on the collective stick or lever 12.

At this point, it should be noted that provision of the three auxiliary control elements 16, 17, 18 of the autorotation training mode control system 7 is illustrated and described only by way of example and not for limiting the present disclosure thereto. Instead, provision of only two auxiliary control elements may also be contemplated, e.g., only the control elements 16 and 17, or only the control elements 17 and 18, or only the control elements 16 and 18. Likewise, more than the three auxiliary control elements 16, 17, 18 may also be provided, e.g., if a pilot collective stick or lever and a co-pilot collective stick or lever are used instead of the collective stick or lever 12, etc. Furthermore, as described above, each one of the auxiliary control elements 16, 17, 18 of the autorotation training mode control system 7 may be arranged on another element of the operator workspace 6 than the one illustrated, even if the preferred location is a location that enables activation thereof without requiring the pilot, e.g., a flight student, and/or the co-pilot, e.g., a flight instructor, from taking his/her hands off the cyclic sticks 13, 14, and/or the collective stick or lever 12.

In addition, the autorotation training mode control system 7 may also comprise a data processing unit 19 configured to control execution of the autorotation training mode. By way of example, and not for limiting the disclosure accordingly, the data processing unit 19 is accommodated in the slant console **9*d***.

The data processing unit 19 may be a dedicated data processing unit. Alternatively, the data processing unit 19 may e.g., be implemented in a Vehicle Management System (VMS) or Avionic System of the helicopter 1 of FIG. 1.

Preferably, the data processing unit 19 enables execution of the autorotation training mode only if predetermined execution conditions are fulfilled. For instance, the predetermined execution conditions may be fulfilled in rotorcraft operation, i.e., operation of the helicopter 1 of FIG. 1, if: no failure levels, preferably no failure levels 1 to 3, are detected on the FADEC 20, no OEI training mode is engaged, and engine torque of the at least one engine **1*g* of FIG. 1 is below a predetermined threshold. Furthermore, the data processing unit 19** is preferably configured for decreasing a predetermined engine free turbine speed datum of the at least one engine by a predetermined reduction rate during execution of the autorotation training mode.

Moreover, the autorotation training mode control system 7 is preferably configured for disengaging the autorotation training mode if one or more predetermined disengagement conditions are fulfilled. Preferably, the data processing unit 19 monitors rotorcraft operating parameters in the rotorcraft operation, i.e., the operation of the helicopter 1 of FIG. 1, and/or the autorotation training mode for determining whether the one or more predetermined disengagement conditions are fulfilled. For instance, the one or more predetermined disengagement conditions may be fulfilled in the rotorcraft operation, i.e., the operation of the helicopter 1, and/or the autorotation training mode, if: an actual engine free turbine speed value of the at least one engine **1*g* of FIG. 1** is below a predetermined engine free turbine speed autorotation reference value, a torque demand increases for a predefined duration above a predetermined torque threshold, and/or a predetermined duration after engagement of the autorotation training mode expires without rotor desynchronization.

FIG. 3 shows an illustrative autorotation training procedure 30 for exemplifying execution of an autorotation training mode according to the present disclosure. By way of example, the autorotation training procedure 30 is described with respect to the helicopter 1 of FIG. 1 that comprises the operator workspace 6 and the autorotation training mode control system 7 of FIG. 1 and FIG. 2.

The autorotation training procedure 30 is initiated at step 41 by activating the autorotation training mode control system 7. Activating the autorotation training mode control system 7 is preferably performed by manually operating, i.e., arming, the at least one main control element 15 which is arranged on the main instrument panel 8 of FIG. 2 of the operator workspace 6, i.e., by pushing the respective button or switch.

In response to activating the autorotation training mode control system 7 at step 41, the data processing unit 19 of FIG. 2 of the autorotation training mode control system 7 is activated at step 42 to control execution of the autorotation training mode. Preferably, the data processing unit 19 triggers initially indication of a respective activated or armed status of the autorotation training mode control system 7 to the flight instructor and/or the flight student in the helicopter 1, at step 43.

By way of example, the data processing unit 19 triggers illumination of the display indicator 21 and/or one or more of the displays 8*a* to 8*d* of FIG. 2 of the autorotation training mode control system 7, e.g., in a predetermined first color. The display indicator 21 may e.g., comprise display of the letter "A" or the letters "AR" or "AR TRAIN", and the predetermined first color may e.g., be orange or amber to indicate an ARMED status.

Subsequently, engagement of the autorotation training mode may be requested at step 44 using e.g., one of the three auxiliary control elements 16, 17, 18 of FIG. 2 of the autorotation training mode control system 7, i.e., by pushing the respective button or switch. However, this step 44 may be optional as engagement of the autorotation training mode may also be the result of activating the autorotation training mode control system 7 at step 41.

In any case, the data processing unit 19 preferably performs at step 45 a parameter check for determining whether predetermined execution conditions for execution of the autorotation training mode are fulfilled. For instance, the parameter check may comprise checking detected failure levels on the FADEC 20 of FIG. 2, an OEI training mode status of the helicopter 1, and a current engine torque of the at least one engine 1*g* of FIG. 1 of the helicopter 1.

If the predetermined execution conditions are fulfilled, i.e., preferably if no failure levels, preferably no failure values 1 to 3, are detected on the FADEC 20, if no OEI training mode is engaged, and if engine torque of the at least one engine 1*g* of FIG. 1 is below a predetermined threshold TRQ_AR_disengage, the autorotation training mode is preferably engaged by the data processing unit 19 at step 46 and rotorcraft operation, i.e., operation of the helicopter 1, is switched from normal flight mode to autorotation training mode. Engagement of the autorotation training mode preferably comprises sending of an autorotation training mode request to the FADEC 20 such that the latter may confirm the request and set e.g., an AR_training_bit as long as the autorotation training mode is engaged, i.e., active.

The autorotation training mode is, then, started at step 49 by decreasing a predetermined engine free turbine speed datum NF_ref reduction rate. This may be done by the FADEC 20 in response to a request of the data processing unit 19.

More specifically, the predetermined engine free turbine speed datum NF_ref may e.g., be decreased by 10% to a decreased engine free turbine speed datum NF_AR_ref, i.e., for instance from 100% to 90%. Preferably, the predetermined reduction rate amounts to at least 1% per second. The decreased engine free turbine speed datum NF_AR_ref is, then, maintained during execution of the autorotation training mode.

Execution of the autorotation training mode is preferably monitored by the data processing unit 19 starting at step 47 and indicated to the flight instructor and the flight student in the helicopter 1 at step 48. By way of example, the data processing unit 19 triggers illumination of the display indicator 21 and/or one or more of the displays 8*a* to 8*d* of the autorotation training mode control system 7 in a different color and eventually different wording than at step 43, i.e., in a predetermined second color, such as e.g., green or white to indicate an ENGAGED status.

By way of example, the steps 41 to 49 are related to an initialization and starting phase of the autorotation training procedure 30, which corresponds to autorotation training mode engagement that is illustratively separately labelled with the reference sign 40. Execution of the autorotation training as such is illustratively separately labelled with the reference sign 50 and comprises, by way of example, steps 51 to 55 described hereinafter.

In response to the decrease of the predetermined engine free turbine speed datum NF_ref from 100% to e.g., the decreased engine free turbine speed datum NF_AR_ref of 90% at step 49, the flight student is expected to lower, i.e., push, at step 51 the collective stick or lever 12 of FIG. 2 of the helicopter 1 in order to desynchronize the at least one main rotor 1*a* of FIG. 1 of the helicopter 1 while keeping the main rotor rotational speed (RRPM) high within required bounds. Thus, the flight student may perform autorotation training at step 52 with the at least one main rotor 1*a* being desynchronized from the at least one engine 1*g* and only being driven by the airflow passing through the at least one main rotor 1*a* from below in order to provide sufficient lift for maintaining a stable descent of the helicopter 1.

It should be noted that performing the autorotation training at step 52 requires the flight student/flight instructor to perform respectively required interventions/actions which, as such, are well-known to the person skilled in the art and not part of the present disclosure. Therefore, performing the autorotation training at step 52 as such is not described in more detail, for brevity and conciseness.

In any case, the data processing unit 19 may monitor at step 53 flight parameters of the helicopter 1 in a conventional manner during the autorotation training. Furthermore, the data processing unit 19 may generate regular indications at step 54 for illustrating the monitored flight parameters, such as e.g., engine and rotor operational parameters.

Moreover, the data processing unit 19 may monitor autorotation training related operating parameters of the helicopter 1 at step 55. For instance, the data processing unit 19 may monitor a current or actual engine free turbine speed NF_act, a current or actual torque demand TRQ_dem, an elapsed time duration T_AR after arming, i.e., between arming and engagement of the autorotation training mode, and a current rotor desynchronization status MR_des. Using the monitored operating parameters, the data processing unit 19 may determine whether one or more predetermined disengagement conditions are fulfilled. The one or more predetermined disengagement conditions are e.g., fulfilled if the value of the current or actual engine free turbine speed NF_act is below a predetermined engine free turbine speed autorotation reference value, e.g., 5% below NF_ref_AR, if the current or actual torque demand TRQ_dem increases for a predefined duration, for instance for a duration of more than 10 s, above the predetermined torque threshold TRQ_AR_disengage, and/or if a predetermined duration, e.g., a duration of at least 5 s, after engagement of the autorotation training mode expires without rotor desynchronization, i.e., if arming is performed without subsequent engagement.

If the one or more predetermined disengagement conditions are fulfilled, the data processing unit 19 and, more generally, the autorotation training mode control system 7 preferably disengages the autorotation training mode at step 62 and sends a disengagement request to the FADEC 20 such that the latter may confirm the request at step 63 and delete the AR_training_bit. Thus, the autorotation training mode control system 7 may be deactivated and the rotorcraft operation may switch back from the autorotation training mode to the normal flight mode.

At this point, it should be noted that disengagement of the autorotation training mode at step 62 may also be requested by the flight student or the flight instructor at step 61. More specifically, disengagement of the autorotation training mode may be requested at step 61 using e.g., one of the three auxiliary control elements 16, 17, 18 of the autorotation training mode control system 7, i.e., by pushing the respective button or switch.

Upon confirming the request at step 63 and deleting the AR_training_bit, the FADEC 20 preferably re-establishes at step 66 the nominal engine free turbine speed datum. In other words, the decreased engine free turbine speed datum NF_AR_ref of 90% is increased back up to the predetermined engine free turbine speed datum NF_ref of presumably 100%.

At this point, it should be noted that the predetermined engine free turbine speed datum NF_ref is not mandatorily and, thus. not on all helicopters 100%. In fact, it may be slightly higher or lower, e.g., depending on type and or flight conditions: OAT, pressure altitude, gross mass, forward speed, and/or NR selectors.

Disengagement of the autorotation training mode is preferably monitored by the data processing unit 19 at step 64 and indicated to the flight instructor and/or the flight student in the helicopter 1 at step 65. By way of example, the data processing unit 19 triggers extinction of the display indicator 21 of the autorotation training mode control system 7 at step 65. Alternatively, a dedicated visual indicator may be visualized and/or illuminated.

By way of example, the steps 61 to 66 are related to a termination phase of the autorotation training procedure 30, which corresponds to autorotation training mode disengagement that is illustratively separately labelled with the reference sign 60.

Finally, it should be noted that modifications to the above-described embodiments are within the common knowledge of the person skilled in the art and, thus, also considered as being part of the present disclosure.

REFERENCE LIST

1 rotorcraft
1*a* multi-blade main rotor
1*b*, 1*c* rotor blades
1*d* rotor head
1*e* rotor shaft
1*f* landing gear
1*g* engines
1*h* portside engine
2 fuselage
2*a* cockpit
2*b* rear fuselage
3 tail boom
3*a* horizontal stabilizer
3*b* tail boom cone
4 counter-torque device
4*a* tail rotor
5 fin
6 operator workspace
7 autorotation training mode control system
8 main instrument panel
8*a*, 8*b*, 8*c*, 8*d* main instrument panel displays
9 center console
9*a*, 9*b* center console displays
9*c* switches and buttons
9*d* slant console
9*e* middle console
10, 11 pedals
12 collective lever
13 pilot cyclic stick
14 co-pilot cyclic stick
15, 16, 17, 18 autorotation training mode control elements
19 autorotation training mode data processing unit
20 full authority digital engine control
21 display indicator
30 autorotation training procedure
40 autorotation training mode engagement
41-49 engagement steps
50 autorotation training execution
51-55 training execution steps
60 autorotation training mode disengagement
61-66 disengagement steps

What is claimed is:

1. A rotorcraft with at least one main rotor and at least one engine for powering the at least one main rotor in a normal flight mode, comprising an autorotation training mode control system that is activatable for switching rotorcraft operation between the normal flight mode and an autorotation training mode configured to enable training of autorotation, wherein the autorotation training mode control system comprises at least one main control element that is manually operable for activating the autorotation training mode control system and switching the rotorcraft operation from the normal flight mode to the autorotation training mode to engage the autorotation training mode;

wherein the autorotation training mode control system comprises a data processing unit configured to control execution of the autorotation training mode;

wherein the data processing unit enables execution of the autorotation training mode only if predetermined execution conditions are fulfilled; and wherein the at least one engine is monitored by a Full Authority Digital Engine Control, and wherein the predetermined execution conditions are fulfilled if: no failure levels are detected on the Full Authority Digital Engine Control, no One Engine Inoperative training mode is engaged, and engine torque of the at least one engine is below a predetermined threshold.

2. The rotorcraft of claim 1, wherein the autorotation training mode control system is configured for disengaging the autorotation training mode if one or more predetermined disengagement conditions are fulfilled.

3. The rotorcraft of claim 2, comprising at least one of a main instrument panel, a slant console, and a middle console, wherein the at least one main control element is arranged on one of the main instrument panel, the slant console, or the middle console, wherein the at least one main control element is a switch or a button.

4. The rotorcraft of claim 2, wherein the at least one main control element is further manually operable for deactivating the autorotation training mode control system and disengaging the autorotation training mode for switching the rotorcraft operation from the autorotation training mode to the normal flight mode.

5. The rotorcraft of claim 2, further comprising, at least one auxiliary control element that is manually operable for activating the autorotation training mode control system and switching the rotorcraft operation from the normal flight mode to the autorotation training mode to engage the autorotation training mode, and/or for deactivating the autorotation training mode control system and disengaging the autorotation training mode for switching the rotorcraft operation from the autorotation training mode to the normal flight mode.

6. The rotorcraft of claim 5, comprising at least one of a collective stick, a pilot cyclic stick, and a co-pilot cyclic stick, wherein the at least one auxiliary control element is arranged on one of the collective stick, the pilot cyclic stick, and/or the co-pilot cyclic stick.

7. The rotorcraft of claim 2, wherein the data processing unit monitors rotorcraft operating parameters for determining whether one or more predetermined disengagement conditions are fulfilled; and wherein the one or more predetermined disengagement conditions are fulfilled if: an actual engine free turbine speed value is below a predetermined engine free turbine speed autorotation reference value, a torque demand increases for a predefined duration above a predetermined torque threshold, and/or a predetermined duration after engagement of the autorotation training mode expires without rotor desynchronization.

8. A rotorcraft with a main rotor and an engine for powering the main rotor in a normal flight mode, comprising an autorotation training mode control system activatable for switching rotorcraft operation between the normal flight mode and an autorotation training mode configured to enable training of autorotation, wherein the autorotation training mode control system comprises a main control element manually operable to switch the rotorcraft operation from the normal flight mode to the autorotation training mode to engage the autorotation training mode mode;

wherein the autorotation training mode control system comprises a data processer configured to control execution of the autorotation training mode;

wherein the autorotation training mode control system is configured to disengage the autorotation training mode if a predetermined disengagement condition is fulfilled wherein the data processer monitors rotorcraft operating parameters to determine whether the predetermined disengagement condition is fulfilled; and wherein the predetermined disengagement condition is fulfilled if: an actual engine free turbine speed value is below a predetermined engine free turbine speed autorotation reference value, a torque demand increases for a predefined duration above a predetermined torque threshold, and/or a predetermined duration after engagement of the autorotation training mode expires without rotor desynchronization.

9. A rotorcraft with at least one main rotor and at least one engine for powering the at least one main rotor in a normal flight mode, comprising an autorotation training mode control system that is activatable for switching rotorcraft operation between the normal flight mode and an autorotation training mode configured to enable training of autorotation, wherein the autorotation training mode control system comprises at least one main control element that is manually operable for activating the autorotation training mode control system and switching the rotorcraft operation from the normal flight mode to the autorotation training mode to engage the autorotation training mode;

wherein the autorotation training mode control system comprises a data processing unit configured to control execution of the autorotation training mode;

wherein the autorotation training mode control system is configured for disengaging the autorotation training mode if one or more predetermined disengagement conditions are fulfilled;

wherein the data processing unit monitors rotorcraft operating parameters for determining whether the one or more predetermined disengagement conditions are fulfilled; and wherein the one or more predetermined disengagement conditions are fulfilled if: an actual engine free turbine speed value is below a predetermined engine free turbine speed autorotation reference value, a torque demand increases for a predefined duration above a predetermined torque threshold, and/or a predetermined duration after engagement of the autorotation training mode expires without rotor desynchronization.

10. The rotorcraft of claim 9, comprising at least one of a main instrument panel, a slant console, and a middle console, wherein the at least one main control element is arranged on one of the main instrument panel, the slant console, or the middle console.

11. The rotorcraft of claim 9, wherein the at least one main control element is a switch or a button.

12. The rotorcraft of claim 9, wherein the at least one main control element is further manually operable for deactivating the autorotation training mode control system and disengaging the autorotation training mode for switching the rotorcraft operation from the autorotation training mode to the normal flight mode.

13. The rotorcraft of claim 9, further comprising, at least one auxiliary control element that is manually operable for activating the autorotation training mode control system and switching the rotorcraft operation from the normal flight mode to the autorotation training mode to engage the autorotation training mode, and/or for deactivating the autorotation training mode control system and disengaging the autorotation training mode for switching the rotorcraft operation from the autorotation training mode to the normal flight mode.

14. The rotorcraft of claim 13, comprising at least one of a collective stick, a pilot cyclic stick, and a co-pilot cyclic stick, wherein the at least one auxiliary control element is arranged on one of the collective stick, the pilot cyclic stick, and/or the co-pilot cyclic stick.

15. The rotorcraft of claim 13, wherein the at least one auxiliary control element is a switch or a button.

16. The rotorcraft of claim 9, wherein the data processing unit enables execution of the autorotation training mode only if predetermined execution conditions are fulfilled.

17. The rotorcraft of claim 9, wherein the data processing unit decreases a predetermined engine free turbine speed datum by a predetermined reduction rate during execution of the autorotation training mode.

18. The rotorcraft of claim 9, wherein the autorotation training mode control system comprises a display indicator for visualizing engagement of the autorotation training mode.

* * * * *